(12) United States Patent
Sada et al.

(10) Patent No.: US 7,273,503 B2
(45) Date of Patent: Sep. 25, 2007

(54) LITHIUM POLYMER SECONDARY BATTERY AND METHOD FOR MANUFACTURING THE SAME

(75) Inventors: Tsutomu Sada, Otsu (JP); Kazunari Takeda, Tsurugashima (JP); Yumiko Takashima, Tano-gun (JP); Naoto Nishimura, Kashihara (JP); Takehito Mitate, Yamatotakada (JP); Kazuo Yamada, Kitakatsuragi-gun (JP); Motoaki Nishijima, Gose (JP); Naoto Torata, Kashihara (JP)

(73) Assignee: Sharp Corporation, Osaka (JP)

( * ) Notice: Subject to any disclaimer, the term of this patent is extended or adjusted under 35 U.S.C. 154(b) by 442 days.

(21) Appl. No.: 10/381,887

(22) PCT Filed: Sep. 28, 2001

(86) PCT No.: PCT/JP01/08522

§ 371 (c)(1),
(2), (4) Date: Aug. 20, 2003

(87) PCT Pub. No.: WO02/27854

PCT Pub. Date: Apr. 4, 2002

(65) Prior Publication Data

US 2004/0023114 A1    Feb. 5, 2004

(30) Foreign Application Priority Data

Sep. 29, 2000  (JP) .............................. 2000-297760

(51) Int. Cl.
*H01M 4/58* (2006.01)
*H01M 10/04* (2006.01)
*H01M 10/40* (2006.01)

(52) U.S. Cl. ...................... 29/623.1; 429/307

(58) Field of Classification Search ............. 429/231.4, 429/307, 317; 29/623.1
See application file for complete search history.

(56) References Cited

FOREIGN PATENT DOCUMENTS

| JP | 05082116 A | * | 4/1993 |
|----|------------|---|--------|
| JP | 6-96800 | | 4/1994 |
| JP | 08329983 A | * | 12/1996 |
| JP | 09259927 A | * | 10/1997 |
| JP | 10158418 A | * | 6/1998 |
| JP | 10218913 | * | 8/1998 |
| JP | 11-26019 A | | 1/1999 |
| JP | 11-283672 A | | 10/1999 |
| JP | 11317228 A | * | 11/1999 |
| JP | 2000-12076 A | | 1/2000 |
| JP | 2000-90925 A | | 3/2000 |
| JP | 2000156230 A | * | 6/2000 |
| JP | 2000-231924 A | | 8/2000 |
| JP | 2000-243451 A | | 9/2000 |

OTHER PUBLICATIONS

International Search Report mailed Dec. 25, 2001 in corresponding PCT Application No. PCT/JP01/08523.
English Translation of International Preliminary Examination Report mailed Aug. 4, 2003 in corresponding PCT Application No. PCT/JP01/08522.

* cited by examiner

*Primary Examiner*—Gregg Cantelmo
(74) *Attorney, Agent, or Firm*—Nixon & Vanderhye P.C.

(57) ABSTRACT

A lithium polymer secondary cell having a negative electrode, a positive electrode and, arranged between the electrodes, a polymer electrolyte layer, characterized in that the cell has been subjected to a heat treatment at a temperature of 40 to 60° C. after the assembly thereof. The polymer cell is freed of or is reduced in the adverse effect of a residual monomer and initiator on the performance of the cell. The polymer electrolyte is formed by cross-linking polymerization of a precursor monomer for an ion conducting polymer in a non-aqueous electrolyte, and the residual monomer and initiator contained therein is consumed by the heat treatment.

2 Claims, 3 Drawing Sheets

LITHIUM POLYMER SECONDARY BATTERY AND METHOD FOR MANUFACTURING THE SAME

This application is a continuation of international application PCT/JP01/08522 filed 28 Sep. 2001 which designates the U.S.

FIELD OF THE INVENTION

This invention relates to a lithium secondary battery using an ion-conductive polymer. More specifically, it relates to a lithium polymer secondary battery comprising an anode having an electroactive substance comprised of a carbonaceous material capable of electrochemically insertion and release of lithium, a cathode having an electroactive substance comprised of a chalcogenide compound containing lithium, and a polymer electrolyte layer comprised of a matrix of an ion-conductive polymer retaining a nonaqueous electrolyte solution therein. The invention also relates to a method for manufacturing the above battery.

BACKGROUND ART

Lithium secondary batteries have a higher energy density in theory compared to other batteries and thus allow to manufacture a small and light-weight battery. Therefore, vigorous studies have been focussed thereon to develop a power source of portable electronic instruments. Particularly, performance of such instruments is even increasing in recent years and their power source is required concomitantly therewith to exhibit better discharging characteristics even at a high load. In order to fulfill these requirements, various studies are in progress next to the prior art battery using nonaqueous electrolyte solutions referred to as lithium ion battery to develop a battery using a polymer electrolyte that functions both as the nonaqueous electrolyte solution and the polymer separator of the prior art battery. Much interest has been focussed to a lithium secondary battery using the polymer electrolyte because of its remarkable advantages such as the possibility of making the battery smaller and thinner in size and lighter in weight as well as leak free.

Generally, secondary batteries now available in the market such as lithium secondary batteries make use of a nonaqueous electrolyte solution prepared by dissolving an electrolyte salt in an organic solvent. The use of this solution is problematic because the solution is easily susceptible to leakage from the battery parts, dissolution of electrode substances or vaporization which may develop problems of long term reliability, spilling off in the sealing process and the like.

In order to improve these problems, lithium secondary batteries have been developed which make use of a polymer electrolyte macroscopically occurring as a solid. The polymer electrolyte consists of a porous matrix of an ion-conductive polymer impregnated with or retaining a nonaqueous electrolyte solution (a lithium salt solution in an aprotic polar organic solvent).

Carbonaceous materials have also been studied and used in practice as an anode material in recent years because their potential at which they include and release lithium is much closer to the potential at which lithium precipitates and dissolves than other electrode materials.

Graphite is a carbonaceous material having a high capacity per unit weight and unit volume among a large number of carbonaceous materials because graphite is capable of inclusion of a single lithium atom per every 6 carbon atoms within its crystal lattice in theory. Graphite exhibits a generally flat lithium inclusion and release potential and is chemically stable. These properties largely contribute to the battery cycle stability.

Graphite-based carbonaceous materials give a discharge capacity close to the theoretical capacity in a nonaqueous electrolyte solution primarily containing ethylene carbonate as noted above. However, a problem remains to exist that its high crystallinity tends to cause decomposition of the nonaqueous electrolyte solution. For example, propylene carbonate (PC) used as a solvent has a wide potential window, a low solidifying temperature (−70° C.) and a high chemical stability and, therefore, has been widely used as a solvent in the nonaqueous electrolyte solution of the lithium battery. However, it is reported that when graphite is used as an anodic electroactive substance, PC is remarkably decomposed and the charge and discharge of the graphite anode becomes impossible even when PC is present in the electrolyte solution only at 10%. See, J. Electochem. Sco., Vol. 142, 1746(1995).

In order to improve the ion-conductivity at a low temperature, a variety of nonaqueous electrolyte solutions using a mixture of EC with various low-viscosity solvents have been reported considering difficult penetration of the electrolyte solution into the electrode when the solvent thereof is EC alone having a high viscosity. However, certain problems remain unsolved in the steps of manufacturing the battery such as volatility and leakage of the solvent. Although the use of macroscopically solid polymer electrolyte in conjunction with the carbonaceous anode material may overcome many of the above problems associated with the prior art batteries, certain new problems arising out from the use of polymer electrolyte and carbonaceous anode have been found.

The polymer electrolyte is prepared by polymerizing and crossling a precursor monomer of the ion-conductive polymer in a mixture with the nonaqueous electrolyte solution in situ. Whether the polymerization is heat polymerization or photopolymerization, it is imperative to use a polymerization initiator. Because not all amounts of the monomer and the initiator have been consumed in the polymerization reaction, it is inevitable for the monomer and the initiator to remain in the resulting polymer electrolyte at a certain level.

The presence of residual monomer can develop a problem of formation of a passivation film on the electrode that increases interfacial resistance between the electrode and the polymer electrolyte and also evolution of a gas as a consequence of the chemical reaction of its polymerizable carbon to carbon double bond with the cathodic and/or anodic electroactive substances. The same applies to residual polymerization initiators. Since residual monomer and initiator may adversely affect the battery performance, e.g. charge-discharge cycle characteristics and discharging characteristics at high load in particular, it is desirable to decrease the residual monomer and initiator levels as low as possible.

JP-A-10218913 teaches that the amount of unreacted monomer and polymerizable oligomers in the polymer electrode may be decreased to lower than 30% by weight by irradiating the monomer with UV radiation at an intensity greater than 20 mW/cm$^2$. This method intends to elevate the reaction rate of the monomer by means of polymerization conditions and does not relates to the reduction of residual monomer levels secondarily after polymerization. Moreover the method does not eliminate nor ameliorate the adverse effects of residual initiator on the battery performance.

JP-A-10-158418 teaches to decrease the residual initiator and stabilizer levels in a self-sustained film of ion-conductive polymer by heating the film at an elevated temperature, for example, at 150° C. or ultrasonically rinsing the film in tetrahydrofuran. The treated film is electrolyte-free and, therefore, must be impregnated with a nonaqueous electrolyte solution.

This method is also disadvantageous compared with the method in which a gelled polymer electrolyte layer is formed integrally with the electrode by casting a monomer-nonaqueous electrolyte solution mixture on the electroactive substrate layer of the respective electrodes and then irradiating with UV radiation not only in terms of production efficiency due to a large number of steps but also in terms of risks of adverse effects on the battery performance due to insufficient impregnation and electrical and mechanical mal-contact of the film with the electrode.

Accordingly, the problems to be solved by the present invention is to overcome the disadvantages of the prior art batteries and also to eliminate or ameliorate any adverse effect of residual monomer and initiator in the polymer electrolyte on the battery performance.

DISCLOSURE OF THE INVENTION

The present invention provides a lithium polymer secondary battery comprising an anode having a layer of electroactive substance comprised of a carbonaceous material capable of electrochemically inclusion and release of lithium, a cathode having a layer of electroactive substance comprised of a lithium chalcogenide compound, and a polymer electrolyte layer sandwiched between the cathode and the anode characterized in that the battery has been thermally treated at a temperature between 40° C. and 60° C. after assemblage.

The present invention also provides a method for manufacturing the above lithium polymer secondary battery. The method comprises the steps of providing said cathode and said anode; forming said polymer electrolyte layer integrally with the respective electrodes; joining the cathode and the anode together with the polymer electrolyte layers facing inwardly; and thermally treating the assmbled battery at a temperature between 40° C. and 60° C.

The thermal treatment according to the present invention converts the residual monomer to an inert polymer by means of secondary thermal polymerization and at the same time substantially decreases the level of residual initiator relative to the level thereof before the thermal treatment by consuming the residual initiator in said secondary polymerization. The term "substantially" as used herein refers to decrease of the total amounts of residual monomer and initiator before thermal treatment at least 40% and preferably at least 50%.

The thermal treatment according to the present invention affords several significant advantages. It empolys a highly efficient method of the fabrication of battery by simply joining polymer electrolayers integrally formed with the respective electrodes together. The thermal treatment also improves the battery performance, particularly the charge-discharge cycle characteristics and discharging characteristics under high loads owing to not only decreased levels of residual monomer and residual initiator compared to their levels in untreated battery but ease of penetration of ion-conductive polymer having a low viscosity at an elevated temperature. The thermal treatment according to the present invention also contributes to decreased leakage of liquid from the battery due to accelerated crosslinking reaction of the matrix ion-conductive polymer.

BEST MODE FOR CARRYING OUT OF THE INVENTION

The battery of the present invention may be manufactured by forming an ion-conductive polymer layer separately on a pre-fabricated cathode and anode and joining the layers together although the manufacturing process is not limited thereto.

Basically, the anode and cathode comprise a current collector in the form of a metal foil and an electroactive substance of the respective electrodes bound with a binder material. The materials of the collector foil include aluminum, stainless steel, titanium, copper, nickel and the like. Aluminum and copper are employed for the cathode and the anode, respectively in consideration of their electrochemical stability, ductility and economy.

Although metal foils are mainly shown herein as the form of anode and cathode collectors, other forms such as mesh, expanded metals, laths, perforated sheets or plastic films having a coating of an electron-conductive material may be employed although the form of collector is not limited thereto.

The electroactive substance of the anode is a carbonaceous materical capable electrochemically inclusion and release of lithium. Typical examples thereof include particles (flakes, aggregates, fibers, whiskers, beads or ground particles) of natural or artificial graphite. Artificial graphite produced by graphitizing mesocarbon beads, mesophase pitch powder or isotropic pitch powder may also be used.

With regard to the electroactive substance used in the present invention, it is more preferable to use as the carbonaceous material graphite particles having attached to the surfaces thereof amorphous carbon particles. These particles may be obtained by dipping the graphite particles in a coal-based heavy oil such as pitch or a petroleum-based heavy oil and heating recovered graphite particles to a temperature above the carbonizing temperature to decompose the heavy oil, if necessary, followed by milling. Such treatment significantly retards the decomposing reaction of the nonaqueous electrolyte solution and the lithium salt occurring at the anode during the charge cycle to enable the charge and discharge cycle life to be improved and also the gas evolution due to the above decomposition reaction to be prevented. In the above carbonaceous material, micropores contributing to increase in BET specific surface area have been filled with the attached carbon particles derived from the heavy oil. The specific surface area thereof is generally below 5 $m^2/g$, preferably in the range between 1 to 5 $m^2/g$. Greater specific surface areas are not preferable because increased contacting surface area with the ion-conductive polymer makes undesired side reactions to be taken place more easily.

The cathodic electroactive substance to be used in the present invention in conjunction with the carbonaceous anodic active substance is preferably selected from a composite oxide of laminar or spinel structure represented by the formula: $Li_a (A)_b(B)_c O_2$ wherein A is a transition metal element;

B is an element selected from the group consisting of a non-metal or semi-metal element of group 3B, 4B and 5B of the periodic chart, an alkaline earth metal, Zn, Cu and Ti;

a, b and c are numbers satisfying the following relationship:

$$0 < a \leq 1.15$$

$$0.85 \leq b+c \leq 1.30, \text{ and}$$

$$c > 0$$

Typical examples of the composite oxides include $LiCoO_2$, $LiNiO_2$ and $LiCo_xNi_{1-x}O_2$ ($0<x<1$). Use of these compounds in conjunction with a carbonaceous material as a anodic electroactive substance is advantageous in that the battery exhibits a practically acceptable dynamic voltage even when the voltage variation generated by charging and discharging the carbonaceous material per se (about 1 volt vs. $Li/Li^+$), and that lithium ions necessary for charging and discharging the battery are already contained in the form of, for example, $LiCoO_2$ or $LiNiO_2$ before assembling the battery.

When preparing the anode and cathode, the respective electroactive substances may be combined, where necessary, with a chemically stable conductor material such as graphite, carbon black, acetylene black, carbon fiber or conductive metal oxides to improve the electron conductivity thereof.

Typical examples of the composite oxides include $LiCoO_2$, $LiNiO_2$ and $LiCo_xNi_{1-x}O_2$ ($0<x<1$). Use of these compounds in conjunction with a carbonaceous material as a anodic electroactive substance is advantageous in that the battery exhibits a practically acceptable dynamic voltage even when the voltage variation occurred by charging and discharging the carbonaceous material per se (about 1 volt vs. $Li/Li^+$), and that lithium ions necessary for charging and discharging the battery are already contained in the form of, for example, $LiCoO_2$ or $LiNiO_2$ before assembling the battery.

The binder is selected among those thermoplastic resins which are chemically stable, soluble in a suitable solvent but hardly attacked with the nonaqueous electrolyte solution. A variety of such thermoplastic resins have been known. For example, polyvinylidene fluoride (PVDF) may preferably used since this resin is selectively soluble in N-methyl-2-pyrrolidone. Other examples of usable thermoplastic resins include polymers and copolymers of acrylonitrile, methacrylonitrile, vinyl fluoride, chloroprene, vinyl pyridine and its derivatives, vinylidene chloride, ethylene, propylene and cyclic dienes (e.g. cyclopentadiene, 1,3-cyclohexadiene). A dispersion of the binder resin may also be used in place of a solution.

The electrode may be produced by kneading the respective electroactive substances and, where necessary, the conductor material with a solution of the binder resin to prepare a paste, applying the paste on a metal foil using a suitable coater to form a film of uniform thickness, and compressing the film after drying. The proportion of the binder resin in the electroactive substance layer should be minimum and generally lies from 1 to 15% by weight. The proportion of the conductor material usually lies, when used, from 2 to 15% by weight of the electroactive substance layer.

The polymer electrolyte layer is formed on the respective electroactive substance layers thus prepared integrally therewith. The polymer electrolyte layer is comprised of a matrix of an ion-conductive polymer impregnated with or retaining a nonaqueous electrolyte solution containing a lithium salt. The polymer electrolyte layer occurs macroscopically in a solid state but microscopically retains a continuous phase of the lithium solution formed therein in situ. The polymer electrolyte layer of this type has an ion-conductivity higher than that of the corresponding polymer electrolyte free from the lithium solution.

The polymer electrolyte layer may be formed by polymerizing (heat polymerization, photopolymerization etc.,) a precursor monomer of the ion-conductive polymer in the form of a mixture with the nonaqueous electrolyte solution containing a lithium salt.

The monomer component of the above mixture which can be used for this purpose should include a polyether segment and also be polyfunctional in respect to the polymerization site so that the resulting polymer forms a three dimensional crosslinked gel structure. Typically, such monomers may be prepared by esterifying the terminal hydroxyl groups with acrylic or methacrylic acid (collectively called "(meth) acrylic acid"). As is well known in the art, polyether polyols are produced by addition-polymerizing ethylene oxide (EO) alone or in combination with propylene oxide (PO) using an initiator polyhydric alcohol such as ethylene glycol, glycerine or trimethylolpropane. A monofunctional polyether polyol (meth)acrylate may be used in combination with polyfunctional monomers.

The poly- and monofunctional monomers are typically represented by the following general formulas:

wherein $R_1$ is hydrogen or methyl;

$A_1$, $A_2$ and $A_3$ are each a polyoxyalkylene chain containing at least 3 ethylene oxide (EO) units and optionally some propylene oxide (PO) units such that PO/EO=0–5 and EO+PO$\geq$35.

wherein $R_2$ and $R_3$ are hydrogen or methyl;

$A_4$ is a polyoxyalkylene chain containing at least 3 EO units and optionally some PO units such that PO/EO=0–5 and EO+PO$\geq$10.

wherein $R_4$ is a lower alkyl, $R_5$ is hydrogen or methyl, and $A_5$ is a polyoxyalkylene chain containing at least 3 EO units and optionally some PO units such that PO/EO=0–5 and EO+PO$\geq$3.

The nonaqueous electrolyte solution is prepared by dissolving a lithium salt in a nonpolar, aprotic organic solvent. Non-limitative examples of the lithium salt solutes include $LiClO_4$, $LiBF_4$, $LiAsF_6$, $LiPF_6$, LiI, LiBr, $LiCF_3SO_3$, $LiCF_3CO_2$, $LiNC(SO_2CF_3)_2$, $LiN(COCF_3)_2$, $LiC(SO_2CF_3)_2$, LiSCN and mixtures thereof.

Non-limitative examples of the organic solvents include cyclic carbonate esters such as ethylene carbonate (EC) or propylene carbonate (PC); straight chain carbonate esters such as dimethyl carbonate (DMC), diethyl carbonate (DEC) or ethyl methyl carbonate (EMC); lactones such as γ-butyrolactone (GBL); esters such as methyl propionate or ethyl propionate; ethers such as tetrahydrofuran and its derivatives, 1,3-dioxane, 1,2-dimethoxyethane, or methyl diglyme; nitriles such as acetonitrile or benzonitrile; dioxolane and derivatives thereof; sulfolane and derivatives thereof; and mixtures of these solvents.

Since the polymer electrolyte on the electrode, particularly on the carbonaceous material of the anode is required to contain a nonaqueous electrolyte solution of which side reactions with the graphite-based carbonaceous material are retarded, it is preferable to use a solvent system consisting primarily of EC and another solvent selected from PC, GBL, EMC, DEC or DMC. For example, a nonaqueous electrolyte solution containing 3 to 35% by weight of a lithium salt dissolved in the above solvent mixture containing 2 to 50% by weight of EC exhibits a satisfactory ion conductivity even at low temperatures.

The proportion of the nonaqueous solution in the mixture with the precursor monomer should be large enough to maintain the solution as continuous phase in the crosslinked polymer electrolyte layer but should not be so excessive to undergo phase separation and bleeding of the solution from the gel. This can be accomplished by the ratio of the monomer to the electrolyte solution generally within a range from 30/70 to 2/98, preferably within a range from 20/80 to 2/98 by weight.

The polymer electrolyte layer may optionally include a porous substrate as a support member. Such substrate may be either a microporous membrane made from a polymer which is chemically stable in the nonaqueous electrolyte solution e.g. polypropylene, polyethylene or polyester, or a sheet (i.e. paper or nonwoven fabric) made from fiber of such poymers. It is preferable, that the substrate has a air permeability from 1 to 500 sec./cm$^3$ and can retain the polymer electrolyte therein at a substrate: polymer electrolyte ratio from 91/9 to 50:50. This is necessary to achieve an optimum balance between the mechanical strength and the ion conductivity.

When the substrate is not used, the polymer electrolyte layer integral with the respective electrodes may be fabricated by casting the mixture of the precursor monomer and the nonaqueous electrolyte solution on the respective electroactive substance layers to form a film and polymerizing the monomer in situ. Then both electrodes are joined together with their polymer electrolyte layers facing inwardly.

When used, the substrate is applied on the electroactive substance layer of either one of the electrodes. Then the mixture of the precursor monomer and the electrolyte solution is cast on the substrate followed by polymerization of the monomer in situ to form the polymer electrolyte layer integral with the substrate and the electrode. This electrode is joined together with the other electrode including the polymer electrolyte layer free of the substrate formed as above with their polymer electrolyte layers facing inwardly.

The above methods are preferred since they insure to form the polymer electrolyte layer integral with the electrode and the substrate, when used, in a simple manner.

The mixture of the precursor of ion-conductive polymer (monomer) and the nonaqueous electrolyte solution containing a lithium salt contains a suitable polymerization initiator depending on the polymerization method, e.g. a peroxide type or azo type initiator for heat polymerization and a photoinitiator such as acetophenone, benzophenone or phosphine series for photopolymerization. The polymerization initiator may be used in an amount from 100 to 1,000 ppm and should not be used in excess.

The battery thus prepares is subjected to the heat treatment according to the present invention to decrease the level of monomer and polymerization initiator remaining in the polymer electrolyte layer.

The heat treatment is carried out at temperature between 40° C. and 60° C. whereupon a secondary crosslinking reaction of the residual monomer takes place. Since the speed of chemical reactions in general is the function of temperature, the higher the temperature within the above range the shorter the above crosslinking reaction time. However, excessively high temperature may accelerate decomposition of lithium salt in the nonaqueous electrolyte solution or phase separation and volatilization of the organic solvent while the reaction time will be too long at a too low temperatures. The prevention of undesirable side reactions and the practically acceptable reaction time may be well balanced within the above temperature range. Also the heat treating time must be long enough to ensure the penetration of ion-conductive polymer molecules into the electrode. Since the amount of residual monomer and residual initiator may vary with the type and the initial amounts of monomer and initiator before polymerization, the optimum treating time may easily be determined empricially and generally ranges from 2 hours to 12 hours.

EXAMPLE

The following Examples are for illustrative purpose only and not intended to limit the scope of the present invention thereto.

Example 1

1) Fabrication of Anode

As a carbonaceous material, a particulate graphite having amorphous carbon microparticles attached to the surfaces of graphite particles was used. The graphite particles have a d002 value of 0.336 nm determined according to the large angle X-ray diffraction method, an Lc value of 100 nm, an La value of 97 nm and a BET specific surface area of 2 m$^2$/g.

A blend of 100 weight parts of the above carbonaceous material and 9 weight parts of polyvinylidene fluoride (PVDF) was kneaded with an amount of N-methyl-pyrrolidone (NMP). The resulting paste was applied onto a rolled copper foil of 20 μm thickness, dried and compressed. The surface area of the anode was 9 cm$^2$ and the thickness thereof was 85 μm.

2) Nonaqueous Electrolyte Solution/Monomer Mixture $LiBF_4$ was dissolved at a concentration of 1.0 mol/L in a mixture of ethylene carbonate (EC):propylene carbonate (PC): γ-butyrolactone (GBL): ethyl methyl carbonate (EMC)=30:20:30:20 by volume.

To 90 weight parts of this solution were added 5 weight parts of a trifunctional polyether polyol triacrylate (MW=7500-9000) of the formula:

wherein $A_1$, $A_2$ and $A_3$ are each polyoxyalkylene chain containing at least 3 EO units and at least one PO unit in PO/EO ratio of 0.25; and 5 weight parts of triethylene glycol methyl ether acrylate of the formula:

Then 1,000 ppm of 2,2-dimethoxy-2-phenylacetophenone (DMPA) was added to prepare a polymerization liquid.

3) Fabrication of Polymer Electrolyte Layer Integral with Anode and Separator Substrate The above polymerization liquid was cast on the electroactive substance layer of the anode.

A polyester nonwoven fabric having an air permeability of 380 sec/cm³, a thickness of 20 μm and an area of 10 cm² was placed on the anode and the above polymerization liquid was poured thereon in an amount sufficient to reach a fabric: liquid ratio=90:10 by weight. Then the anode-fabric stack was irradiated with UV radiation of 365 nm wavelength at an intensity of 30 mW/cm² for 3 minutes to form a gelled polymer electrolyte layer integrally with the anode and the nonwoven fabric. The thickness of the polymer electrolyte layer was 20 μm.

4) Fabrication of Cathode 100 weight parts of $LiCoO_2$ having an average particle size of 7 μm and 5 weight parts of acetylene black, and 5 weight parts of PVDF were blended and kneaded with an amount of NMP. The resulting paste was applied on a rolled aluminum foil of 20 μm thickness, dried and compressed. The area and the thickness of cathode were 80 μm and 9 cm², respectively.

5) Fabrication of Polymer Electrolyte Layer Integrally with Cathode.

The above polymerization liquid was cast on the cathode and irradiated with UV radiation of 365 nm wavelength at an intensity of 30 mW/cm² for three minutes to fabricate a polymer electrolyte layer integrally with the cathode. The thickness of the polymer electrolyte layer was 10 μm.

6) Assembly and Heat Treatment of Battery.

The cathode and the anode as prepared above were joined together with their polymer electrolyte layers facing inwardly to assemble a battery having a total thickness of 190 μm. The assembled battery was kept in a thermostat vessel at 45° C. for 8 hours.

Comparative Example 1

The heat treatment in Example 1 was dispensed with and the battery was aged for 8 hours at room temperature.

The batteries manufactured in Example 1 and Comparative Example 1 were charged at a constant current of 2.3 mA until the battery voltaged reached 4.1 V. Then the charge was continued at a constant voltage for 12 hours in total precharge time of 12 hours and discharged at constant current levels of 2, 3, 5, 10 and 20 mA until the battery voltage decreased to 2.75 V.

Figure 1:
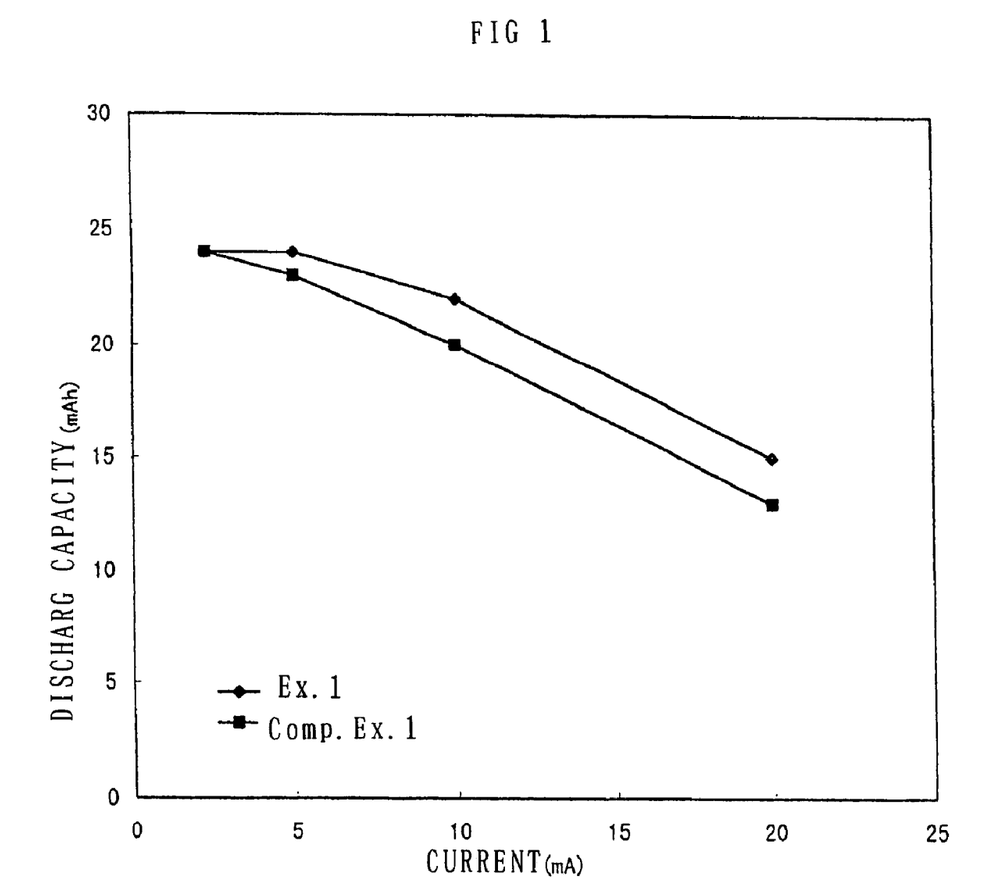
FIG. 1 is a graph showing the discharge capacity at different current levels of the battery according to Example 1 of the present invention in comparison with the battery according to Comparative Example 1.
Figure 2:
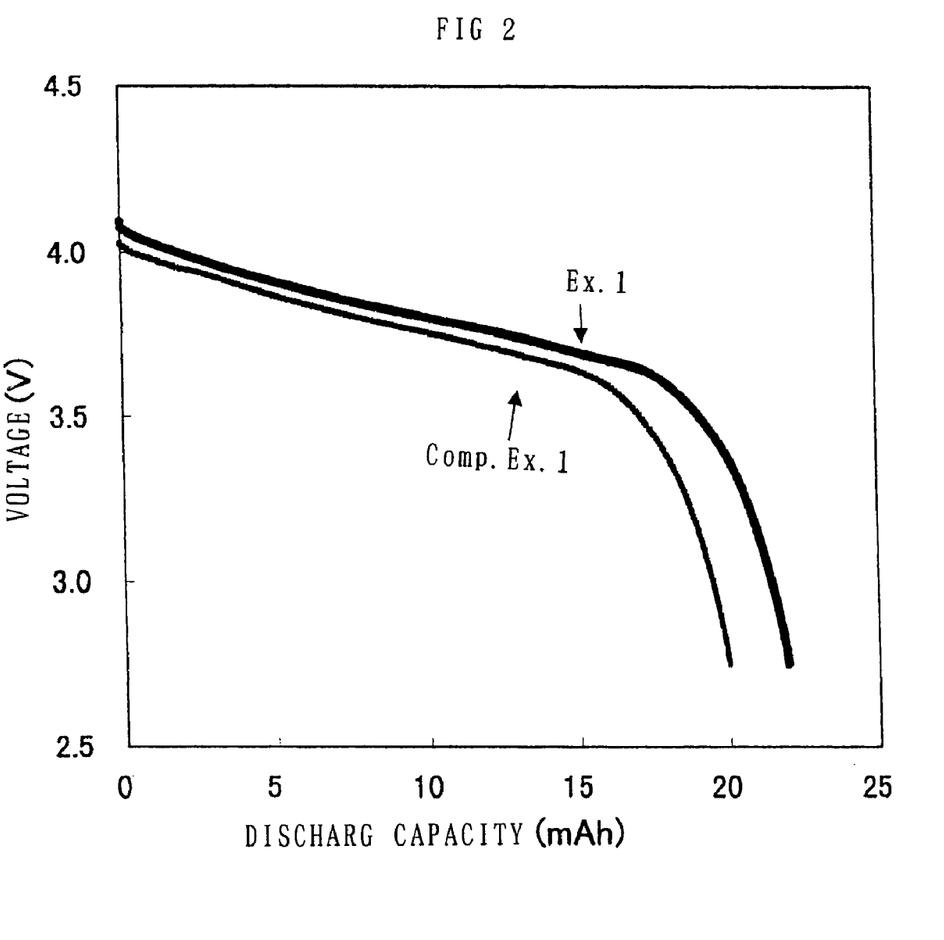
FIG. 2 is a graph showing the discharge curve at a constant current of 10 mA of the battery according to Example 1 of the presnet invention in comparison with the battery according to Comparative Example 1.

The results of discharge at different current levels are shown in the graph of FIG. 1. FIG. 2 shows the discharge curves of the batteries of Example 1 and Comparative Example 1 when the batteries were discharged at a constant current of 10 mA.

As shown in FIG. 1, a significant differenct may be seen in the discharge capacity after discharging at different current levels between the batteries with and without the heat treatment.

As shown in the discharge curves of FIG. 2, the voltage drop immediate after the start of discharge is smaller in the battery of Example 1 than in the battery of Comparative Example 1 and the average discharge voltage is higher in the battery of Example 1 than in the battery of Comparative Example 1. These results suggest that increase in the interfacial resistance between the polymer electrode layer and the respective electrodes has been suppressed by the heat treatment at 45° C. The improvement of interfacial resistance is thought to be related to the penetration of polymer electrolyte into the interior of cathode and anode during the heat treatment.

Subsequent to the above tests, the batteries were disassembled to obtain samples of respective polymer electrolytes for assaying two monomers remaining therein by the GPC method. Percents of the residual monomer relative to the total amount of monomers added to the polymerization liquid were 4.3% in the battery of Example 1 with the heat treatment and 7.4% in the battery of Comparative Example 1 without the heat treatment, respectively.

The same samples were assayed for the residual initiator levels using the HPLC method. Percents of residual initiator relative to the amount thereof added to the polymerization liquid were 9.5% in the battery of Example 1 and 32.4% in the battery of Comparative Example 1, respectively.

These results demonstrate the effectiveness of the heat treatment according to the present invention to decrease the levels of monomer and initiator remaining in the polymer electrolyte. The amounts of residual monomer and initiator are related to the interfacial resistance between the polymer electrolyte and the electrode.

It is postulated that the larger in the amount of residual monomer and initiator the easier in the formation of film having a high interfacial resistance during charge and discharge cycles.

Example 2

A battery was manufactured by altering Example 1 as follows.

1) Nonaqueous Electrlyte Solution

A 1.0 mol/L solution of $LiBF_4$ in a solvent mixture of EC:PC:EMC=35:30:35 by volume.

2) Polymerization Liquid

Into 90 weight parts of the above nonaqueous electrolyte solution were added 5 weight parts of a trifunctional poly ether polyol polyacrylate having a molecular weight of 7,500-9,000 of the formula:

wherein $A_1$, $A_2$ and $A_3$ are each polyoxyalkylene chain containing at least 3 EO units and at least one PO unit in PO/EO ratio of 0.25; 5 weight parts of a monofunctional polyoxyalkylene glycol monoethyl ether monoacrylate having a molecular weight of 2,500-3,000 of the formula:

wherein $A_6$ is a polyoxyalkylene chain containing at least 3 EO units and at least one PO unit in PO/EO ratio of 0.25; and 750 ppm of 1-hydroxycyclohexyl phenyl ketone.

3) Heat Treatment

At 45° C. for 8 hours (same as in Example 1).

The battery was charged at a constant current of 2.3 mA until the battery voltage reached 4.1 V and the charge was continued at a constant voltage for a total charge time of 12 hours. Thereafter the battery was discharged at different constant current levels of 2.3 mA and 10 mA, respectively until the battery voltage decreased to 2.75 V.

Comparative Example 2

The heat treatment of Example 2 was dispensed with. The battery of Example 2 without heat treatment was charged at a constant current of 2.3 mA until the battery voltage reached 4.1 V and the charge was continued at a constant voltage for a total pre-charge time of 12 hours. Then the battery was heat treated at 45° C. for 8 hours. The treated battery was then discharged at different constant current levels of 2.3 mA and 10 mA until the battery voltage decreased to 2.75 mA.

Comparative Exmaple 3

Example 1 was repeated except that the carbonaceous material was replaced with a particulate artificial graphite having a d002 according to the large angle X-ray diffraction method of 0.337 nm, an Lc of 100 nm, an La of 100 nm and a BET specific surface area of 10 m²/g. The heat treatment was dispensed with.

The battery was charged at a constant current of 2.3 mA until the battery voltage reached 4.1 V and the charge was continued at a constant voltage for a total pre-charge time of 12 hours. The charged battery was then discharged at different current levels of 2.3 mA and 10 mA until the battery voltage decreased to 2.75 mA.

With regard to the batteries of Example 2, Comparative Examples 2 and 3, the discharge capacity under the above conditions and the charge-discharge efficiency at the first charge-discharge cycle were determined. The results are shown in the table below.

| Battery | Discharge capacity | | Charge-discharge efficiency at first cycle |
|---|---|---|---|
| | At 2.3 mA | At 10 mA | |
| Ex. 2 | 24.0 mA hr | 21.9 mA hr | 85% |
| Comp. Ex. 2 | 23.0 mA hr | 19.5 mA hr | 79% |
| Comp. Ex. 3 | 19.0 mA hr | 13.0 mA hr | 65% |

As is apparent from the above results, the battery of Comparative Example 2 were inferior to the battery of Example 2 in terms of the discharge capacity and the charge-discharge efficiency at the first cycle. This is thought to be attributed to the side reactions of residual initiator within the cathode and the anode during the initial charge and demonstrates that the post heat treatment after the first charge is not effective.

The battery of Comparative Example 3 was also inferior to the batteries of Example 2 and Comparative Example 2 in terms of the discharge capacity and the charge-discharge efficiency at the first cycle. This is thought to be attributed to large extent to the nature of anodic electroactive substance used which is easily susceptible to the side reactions with the residual monomer and initiator suggesting that the heat treatment according to the present invention exhibits a remarkable effect particularly when the carbonaceous material used in the anode is a particulate graphite having amorphous carbon attached to the surfaces thereof.

Figure 3:
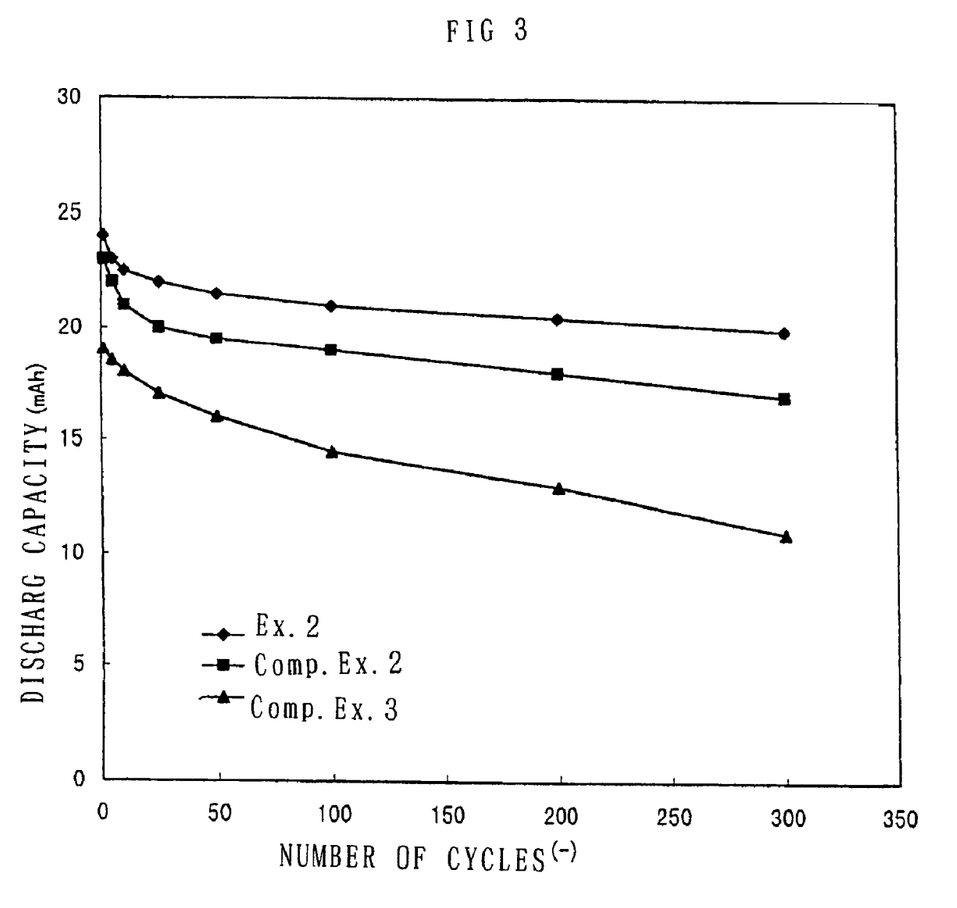
FIG. 3 is a graph showing the result of the charge-discharge cycling test of the battery according to Example 1 of the present invention in comparison with the batteries according to Comparative Examples 2 and 3.

FIG. 3 is a graph showing the result of charge-discharge cycle test of the battery of Example 2 in comparison with the batteries of Comparative Examples 2 and 3. The battery of Example 2 demonstrated better charge-discharge cycle characteristics in this test. This is thought to be attributed not only to decrease in residual monomer and initiator but to improved penetration of the polymer electrolyte within the cathode and the anode all resulting in decrease in the battery internal resistance.

The invention claimed is:

1. A method for manufacturing the lithium polymer secondary battery comprising the steps of:

providing an anode having an electroactive substance comprised of a carbonaceous material capable of electrochemically inclusion and release of lithium and a cathode having an electroactive substance comprised of a chalcogenide compound containing lithium;

forming a polymer electrolyte layer comprised of a matrix of ion-conductive polymer retaining a nonaqueous electrolyte solution therein on the cathode and the anode, wherein said step of forming the polymer electrolyte layer comprises polymerizing and crosslinking a precursor monomer of said ion-conductive polymer in said nonaqueous solution containing a lithium salt in situ in the presence of a polymerization initiator;

joining the cathode and the anode together with their polymer electrolyte layers facing inwardly to manufacture the battery; and subjecting the battery as manufactured to a heat treatment before charging the battery initially, whereby the amounts of the precursor monomer of said ion-conductive polymer and the polymerization initiator thereof remaining in said polymer electrolyte layers are decreased at least 40% after said heat treatment, wherein said heat treatment is carried out at a temperature between 40° C. and 60° C.

2. The method according to claim 1 further comprising the step of placing a porous substrate made of polyethylene, polypropylene or polyester as a support member on the at least one electrode before forming said polymer electrolyte layer.

* * * * *